United States Patent
Wessendorf et al.

[11] 3,897,503
[45] July 29, 1975

[54] GLYOXAL HEMIACETALS, THEIR PREPARATION AND USE

[75] Inventors: Richard Wessendorf, Essen-Heisingen; Wilhelm Heitmann, Herne, both of Germany

[73] Assignee: Veba-Chemie AG, Wanne Eickel, Germany

[22] Filed: Nov. 29, 1972

[21] Appl. No.: 310,491

[30] Foreign Application Priority Data
Dec. 3, 1971 Germany.............................. 2159975

[52] U.S. Cl........... 260/615 A; 260/601 R; 260/338
[51] Int. Cl............................................. C07c 43/30
[58] Field of Search........................ 260/601, 615 A

[56] References Cited
UNITED STATES PATENTS
2,321,094  6/1943  MacDowell et al................. 260/615
2,360,959  10/1944  MacDowell et al............. 260/615 A FOREIGN PATENTS OR APPLICATIONS
559,362  2/1944  United Kingdom............. 260/615 A OTHER PUBLICATIONS
Derner et al., J.A.C.S. 77, 1285, 1955.
Fiesselman et al., Ber. 87, 906–919, 1954.
Farrov et al., Textile Institute, Journal, 49, T516–517, 1958.

*Primary Examiner*—Howard T. Mars
*Attorney, Agent, or Firm*—Burgess, Dinklage & Sprung

[57] ABSTRACT

The invention provides substantially pure glyoxal hemiacetals of the formula

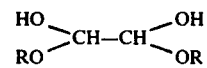

wherein each R in an alkyl radical of 4 to about 36 carbon atoms or together are an α,ω-alkylene radical of 4 to about 36 carbon atoms. They are prepared by reacting the corresponding alkanol or α,ω-alkylene glycol with an aqueous solution of glyoxal of about 2 to 80% concentration by weight; the glyoxal solution may be the impure crude oxidation product of ethylene or acetaldehyde with aqueous nitric acid. The hemiacetal separates from the aqueous solution in which it was prepared and may be reconverted to glyoxal, by heating in the presence or absence of water, the glyoxal having thereby been purified.

5 Claims, No Drawings

GLYOXAL HEMIACETALS, THEIR PREPARATION AND USE

The invention relates to glyoxal hemiacetals, their preparation and isolation, and their use as intermediates for the preparation of acid-free, aqueous solutions of glyoxal, anhydrous glyoxal, and anhydrous glyoxal solutions.

It is known that if alcohols are added to aldehydes hemiacetals first form, further reacting with an additional alcohol molecule with the loss of water to form the acetal:

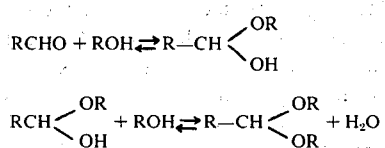

The hemiacetals can be isolated in only a few cases because they are unstable and often are detectable only in solution by special tests (cf. Ph. Le Henaff, Bull. Soc. Chim. 1968, pp. 4687 ff.).

The hemiacetals of glyoxal have not previously been isolated.

It has now surprisingly been found that hemiacetals of glyoxal may be very easily prepared and isolated as definite compounds by reacting aqueous glyoxal solutions with water immiscible alcohols. Thereby there are formed as relatively pure supernatant liquids or crystalline solids glyoxal hemiacetals of the formula

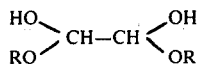

wherein each R is an alkyl radical of 4 to about 36 carbon atoms or together are an α,ω-alkylene radical of 4 to about 36 carbon atoms. Preferably the aqueous glyoxal solution has a concentration of about 2 to 80% by weight and the corresponding alcohol, i.e. alkanol or α,ω-alkylene glycol is reacted in liquid state, e.g. at a temperature above its melting point.

The alcohols to be used, having 4 to 36, and especially 8 to 18 carbon atoms, are preferably unbranched; they may, however, be branched or substituted. Mixtures of these alcohols may also be reacted to form the corresponding glyoxal hemiacetal mixtures some of which are solid and others liquid. Suitable glycols include 1,12-dihydroxydodecane and trimethylhexanediol-(1,6) which may be added to glyoxal to form hemiacetals of higher molecular weight.

In the preparation of the glyoxal hemiacetals, the waterimmiscible alcohols are made to react with aqueous glyoxal solutions by stirring the mixture for a period of time above the melting point of the alcohol, gradually cooling to room temperature or lower, and then separating the glyoxal hemiacetals from the aqueous phase.

Solutions of about 2 to 80% by weight, and especially the commercial 30 to 40% solutions, may be used as aqueous glyoxal solutions. There may be used the crude glyoxal solution produced by the oxidation of acetaldehyde with nitric acid, such solution having a glyoxal content of about 10 to 15%. The by-products present in the aqueous crude glyoxal solutions, such as formic acid, acetic acid, oxalic acid, glycolic acid and glyoxylic acid, do not interfere with the reaction and remain in solution.

It is also possible to prepare the glyoxal hemiacetals by performing the oxidation of the acetaldehyde with dilute nitric acid in the presence of the appropriate alcohols. Alternatively, the glyoxal hemiacetals can be obtained by introducing ethylene into a mixture of diluent nitric acid in the presence of a palladium catalyst. The requisite alcohol may be present during oxidation or may be added subsequently.

The reaction may be performed with the reactants in stoichiometric proportions, i.e., the molar ratio of the glyoxal to the alcohol being 1:2, or also with an excess of either of the two components. It has been found that an excess of glyoxal favorably influences the quality of the product and the yield with reference to the alcohol.

The glyoxal hemiacetals of the invention, whose constitution has been proven by elemental analysis, molecular weight determination, gas chromatography and infrared spectra, are colorless and odorless crystalline or liquid substances which are stable in the presence of dilute acids, and which enter the Cannizzaro reaction with alkali, especially in the warm state, with the formation of glycolic acid and alcohol.

The hemiacetals of the invention may be used advantageously for the preparation of acid-free aqueous glyoxal solutions by cleaving them hydrolytically into glyoxal hydrate and alcohol.

In the preparation of glyoxal Patents acetaldehyde and aqueous nitric acid, as described in German Patent Nos. 521,722, 573,721, 952,083 and 1,244,759 and in French Patent No. 1,008,548, a strongly acid crude glyoxal solution is always produced. In addition to a residual amount of nitric acid, varying amounts of formic acid, acetic acid, oxalic acid, glycolic acid and glyoxylic acid are detectable in the reaction mixture. While the separation of the volatile acids can be achieved to a great extent by distillation, several processes have been proposed for the separation of the non-volatile acids such as glycolic acid, glyoxylic acid and oxalic acid, but none of them are completely satisfactory.

For example, it has been proposed in German DOS 1,154,081 that the crude glyoxal solutions be purified by treatment with carbonates of the metals of the Second Group of the periodic system, especially calcium carbonate. This produces glyoxal solutions which are low in acid but greatly discolored. It has furthermore been proposed to purify acid glyoxal solutions by means of anion exchangers. This process, however, requires large amounts of anion exchangers, and the regeneration of these anion exchangers is very difficult.

Purification of crude glyoxal solutions by electrodialysis as described in German DOS 1,618,281 results in very dilute solutions of glyoxal which tend to discolor upon concentration and the process is very expensive.

U.S. Pat. No. 3,574,765 discloses a process for the decoloration of technical glyoxal solutions by a brief treatment with ozone, without, however, removing the acids present as by-products.

According to Russian Pat. Appln. No. 168,670, a glyoxal solution is obtained by the hydrolysis of rectified glyoxaltetraethylacetal. According to our own experiments and information in the literature (J. Am. Chem. Soc 77 1285 (1955)), however, the formation of acetal from crude glyoxal takes place in a very unsatisfactory manner.

When the glyoxal hemiacetals of the invention are used for the preparation of an aqueous, acid-free glyoxal solution, the above-mentioned difficulties do not exist.

The glyoxal hemiacetals easily prepared from the technical glyoxal solutions can be cleaved in accordance with the following equation:

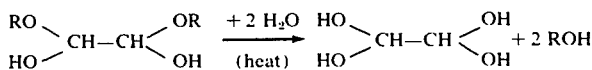

The warm alcohol separated can be used again without further purification for the formation of the glyoxal hemiacetal. The aqueous glyoxal solution is freed of traces of alcohol and concentrated as desired by evaporation. The glyoxal solution so obtained is colorless and odorless and virtually acid-free.

The glyoxal hemiacetals of the invention may be used in an especially advantageous manner for the preparation of anhydrous, monomeric glyoxal by subjecting them to a pyrolytic cleavage which takes place easily in accordance with the following equation:

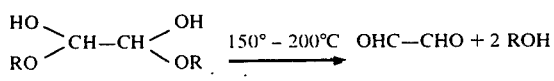

All of the processes known hitherto for the preparation of anhydrous monomeric glyoxal start out with hydrated glyoxal polymers, which are treated with dehydrating agents, and the monomeric glyoxal is then obtained by thermal depolymerization. Disadvantages of these processes are always as excessive carbonization of the polymeric starting material, combined with a reduction of the yield. Even the use of heat transfer agents, such as silicone oil, results in hardly any improvement in the depolymerization reaction.

In contrast, thermal decomposition of the novel monomeric glyoxal hemiacetals to alcohol and glyoxal cleavage products takes place smoothly. Specifically, the carefully dried glyoxal hemiacetals are heated to 150°C with stirring at a pressure of 30 to 100 mm Hg. The glyoxal vapors that form are carried off by means of a gentle stream of nitrogen into a cooled receiver. In the course of the decomposition the temperature is raised to 200°C, until the formation of glyoxal ceases.

The alcohol remaining as a residue still contains some glyoxal, and it can be re-used directly for the production of glyoxal hemiacetal. The thermal decomposition of the glyoxal hemiacetals can advantageously be performed continuously in suitable apparatus, such as a thin-layer evaporator, for example.

Glyoxal is a very reactive chemical product having a melting point of 15°C and a boiling point of 50.4°C, which rapidly polymerizes with traces of moisture to form polymeric glyoxal hydrate. Glyoxal is also polymerized by the action of light. It has therefore been proposed that glyoxal be preserved in solutions of anhydrous ether, tetrahydrofuran, petroleum ether, benzene, carbon tetrachloride, chloroform, methylene chloride or 1,2-difluorotetrachloroethane. In the process of German "Auslegeschrift" 1,768,358 these solutions are partially stabilized with chloranil but Table II in Column 3 of that patent shows this solution is not entirely satisfactory, because after only 14 days in amber bottles 30% of the monomeric glyoxal had polymerized.

In many cases, as for example in the manufacture of certain copolymers, a glyoxal hemiacetal can function as an alcoholic solution of monomeric glyoxal. For example, glyoxal-bis-octylhemiacetal contains 18.24% glyoxal, glyoxal-bis-dodecylhemiacetal 13.48%, and glyoxal-bis-octadecylhemiacetal 9.70%.

The hemiacetals of the invention may also be used for the preparation of other organic solutions of glyoxal, e.g., for the preparation of an anhydrous benzene solution of glyoxal. If vapors of the appropriate solvent are passed through a heated melt of a dry glyoxal hemiacetal, upon condensation there is obtained in the receiver of the still an anhydrous glyoxal solution which can be used directly for a variety of syntheses, such as the Grignard reaction, for example.

The invention will be further described in the following illustrative examples wherein all parts are by weight unless otherwise expressed.

EXAMPLE 1

Glyoxal-bis-decylhemiacetal 145 g of a 20 wt-% crude glyoxal solution (0.5 mole of glyoxal) with an acid number of 80 was stirred in a glass beaker with 175 g (1.1 moles) of n-decanol for several hours at 20°C, until a fine crystalline mass had formed.

The solid product was separated on a suction filter, washed free of acid with cold water, and dried over calcium chloride in a vacuum desiccator.

Yield: 145 g (77.5% of theory)

A sample thereof was recrystallized from diethyl ether: M. P. 79°C.

Analysis: C calculated: 70.54%; C found: 70.50%, 70.20%. H calculated: 12.37%; H found: 12.40%, 12.45%.

EXAMPLE 2

Glyoxal-bis-decylhemiacetal 15.8 g (0.1 mole) of n-decanol was added dropwise with stirring over a period of one hour to 42.6 g of a 13.6 wt-% crude glyoxal solution (0.1 mole of glyoxal). The mixture was stirred for another 4 hours.

The hemiacetal that formed was separated, washed free of acid, and dried. Yield: 17.3 g (92% of theory).

EXAMPLE 3

Glyoxal-bis-dodecylhemiacetal

In a manner similar to Example 1 145 g of a 20 wt-% crude glyoxal solution (0.5 mole of glyoxal) was treated at 25°C with 206 g (1.1 moles) of n-dodecanol.

Yield: 174 g (81% of theory; M.P. 85°C (from diethyl ether).

Analysis: C calculated: 72.50%; C found: 72.20%. H calculated: 12.63%; H found: 12.80%.

EXAMPLE 4

Glyoxal-bis-dodecylhemiacetal 42.6 g of a 13.6 wt-% crude glyoxal solution (0.1 mole of glyoxal) was stirred for four hours at 25°C with 18.6 g (0.1 mole) of n-dodecanol. The precipitate that formed was separated on a suction filter, washed neutral with water, and dried. Yield: 21.5 g of crude product (a quantitative yield with reference to the alcohol).

EXAMPLE 5

Glyoxal-bis-octadecyl-hemiacetal 116 g of a 10 wt-% aqueous glyoxal solution (0.2 mole of glyoxal) was stirred at 60°C with 122 g (0.45 mole) of n-octadecanol. After a short time the hemiacetal that formed began to precipitate. Stirring was continued for another four hours. The separated precipitate was washed with water and dried. After recrystallization from ethyl acetate, 106 g (89% of theory) of glyoxal-bis-octadecylhemiacetal were obtained, comprising colorless crystals with a melting point of 87°C.

Analysis: C calculated: 76.19%; C found: 76.02%. H calculated: 13.12%; H found: 13.58%.

If the glyoxal was used in excess the yield was quantitative.

EXAMPLE 6

Glyoxal hemiacetal mixture from glyoxal and Alfol 2022

31.2 g of an alcohol mixture consisting mainly of arachic alcohol and docosyl alcohol and obtainable as a commercial product known as Alfol 2022 was added dropwise to 42.6 g of a 13.6 wt-% glyoxal solution (0.1 mole of glyoxal) in a stirring vessel at a temperature of 70°C.

After 5 hours of stirring the mixture was cooled to 20°C and the precipitate was separated, washed neutral, and dried. The melting point of the crude product was 71°C. Yield: 33 g (quantitative)

EXAMPLE 7

Hemiacetal from glyoxal and dodecanediol-(1,12)

170 g (0.4 mole) of an aqueous solution of crude glyoxal (13.68% by weight) was heated to 90°C with stirring, together with 40.4 g (0.2 mole) of dodecanediol-(1,12). Within 3 hours the temperature was gradually reduced to 22°C, and stirring continued for about 8 hours at this temperature. The precipitate that formed was separated on a suction filter, washed acid-free and dried.

Yield: 52 g of glyoxalhemiacetal (quantitative)

EXAMPLE 8

Glyoxal-bis-octylhemiacetal 200 g (1.54 mole) of n-octanol and 200 g of 40 wt-% technical glyoxal solution (acid number 64) was stirred for 4 hours at room temperature. Then the upper phase was separated and washed 4 times with 100 ml of water each time.

Yield: 242 g of glyoxal hemiacetal (91% pure)
The acid number amounted to 0.9 mg KOH/g.

EXAMPLE 9

Glyoxal-bis-2-ethylhexylhemiacetal

The procedure of Example 8 was repeated, replacing the n-octanol by 200 g (1.54 moles) of 2-ethylhexanol.
Yield: 236 g of glyoxal hemiacetal (88.6% pure)

EXAMPLE 10a

Glyoxal-bis-dodecylhemiacetal from acetaldehyde

Several grams of acetaldehyde and about 20 g of 1-dodecanol were placed in a reaction flask equipped with stirrer, packed column (50 cm) with attached intensive condenser and proportioning vessels, a spatula tip of sodium nitrite was added, and the mixture was heated to 40°C. Nitric acid was added dropwise to this stirred mixture through the packed column, whereupon the evolution of $N_2O$ gas began, i.e., the oxidation reaction began. Then additional acetaldehyde-alcohol mixture was added. After the addition of a total of 315 g (2 moles) of nitric acid (40% solution),
132 g (3 moles) of acetaldehyde, and
465 g (2.5 moles) of 1-dodecanol, over a period of 1 hour, the reaction mixture was then additionally stirred for several hours at 40°C until the evolution of gas ceased.

After cooling to room temperature, the upper organic phase was separated and washed 3 times with water. After 1 day of standing the glyoxal-bis-dodecylhemiacetal crystallized.

Yield: 225 g of crude product (86% pure)

EXAMPLE 10b

Glyoxal-bis-dodecylhemiacetal from ethylene 1000 g of 25% nitric acid, 2.5 g of palladium nitrate, 0.65 g of lithium chloride and 375 g of 1-dodecanol were heated in a reaction vessel to 40°C. Over a period of 6 hours, 218 liters of ethylene were introduced into this mixture with stirring.

After several hours of standing at room temperature, a solid glyoxal hemiacetal had formed, which was separated by filtration.

268 g of glyoxal-bis-dodecylhemiacetal were obtained as crude product. The filtrate consisted of two phases. From the upper phase 140 g of alcohol was recovered. In the aqueous phase (906 g) the glyoxal content amounted to 2.61% and the residual nitric acid content to 13.2%.

EXAMPLE 11

Hemiacetal from glyoxal and dimeric fatty alcohol

A mixture of 59 g (about 0.1 mole) of a dimeric fatty alcohol (OH Number 190, acid number 0.5) and 14.5 g (0.1 mole) of 40% pure glyoxal solution was stirred for 6 hours at 70°C. Then the reaction product was dehydrated by azeotropic distillation with benzene.

Yield: 64.5 g of hemiacetal (quantitative).
The glyoxal content was 8.5% (calculated 8.9%).

EXAMPLE 12

The use of glyoxal-bis-ocytylhemiacetal for the preparation of an aqueous glyoxal solution by hydrolysis.

100 g of glyoxal-bis-octylhemiacetal (crude product, 91% pure, corresponding to 16.6 g of glyoxal) was stirred for about 15 minutes at 80° to 90°C 3 times with 100 ml of water each time. The warm glyoxal-containing aqueous phases separated each time were combined. The resulting solution contained 13.1 g of the glyoxal input (79%), while the balance remained in the octyl alcohol, which was reused for the formation of hemiacetal. The aqueous solution was adjusted by vacuum distillation to 40 wt-% glyoxal and freed of traces of octanol by ether extraction.

The acid number of the colorless glyoxal solution amounted to 3.1 mg KOH/g.

EXAMPLE 13

The use of glyoxal-bis-dodecylhemiacetal for the preparation of anhydrous glyoxal by thermal cleavage.

100 g (0.23 mole) of glyoxal-bis-dodecylhemiacetal was stirred in a flask provided with a packed column (30 cm) and a distillation attachment, at a pressure of 30 mm Hg and a temperature of 150°C. The yellow glyoxal vapors were driven into the receiver cooled with $CO_2$/isopropanol with the acid of a gentle current of nitrogen.

Within 1 hour the temperature was gradually increased to 180°C, until the evolution of glyoxal had ceased.

Yield: 10.5 g of solid glyoxal.

In the residue (86.5 g) an additional 18.2% of glyoxal hemiacetal was found.

This corresponds to a yield of 95% of theory with a reaction of 81.8% of the glyoxal hemiacetal input.

EXAMPLE 14

The use of glyoxal-bis-octadecylhemiacetal for the continuous production of monomeric, anhydrous glyoxal by thermal cleavage.

A thin-layer evaporator (Rotafilm Model LG 50 of the firm of C. Canzler, Duren) was heated to 150°–160°C, evacuated to 30 mm Hg with a water-jet pump, and a gentle, dry stream of nitrogen was delivered through the distillation receiver. Over a period of one hour, 58.3 g of glyoxal-bis-octadecylhemiacetal (dried crude product 89% hemiacetal, 11% octadecyl alcohol) was introduced into the evaporator from a heated dropping funnel, whereupon a uniform stream of glyoxal formed, which was captured in two refrigerated traps ($CO_2$/isopropanol) connected in series. The cleavage alcohol condensed at the refrigerated trap [Kuhlfanger] which was supplied with 60°C water, and was collected in the distillation receiver.

Yield: 4.3 g of crystalline glyoxal 53.6 g of octadecyl alcohol with 12.7% hemiacetal. This corresponds to a yield of 98% of theory with a cleavage of 87%.

EXAMPLE 15

The use of glyoxal-bis-decylhemiacetal for the preparation of an anhydrous solution of glyoxal in benzene.

100 g of glyoxal-bis-decylhemiacetal (dried crude product 87.2 pure) was melted in a 1-liter three-necked flask with stirring, and heated to 170°C. Benzene vapor was delivered into the hot, stirred melt from a distillation flask. After first running a small amount of a mixture of benzene and water (15 g) through a packed column, the glyoxal-benzene mixture was distilled through the same column at a boiling point of 72° to 77°C into the cooled receiver.

The temperature of the melt was slowly raised to 195°C. In all, 153 g of a solution of 6.6 % glyoxal by weight in benzene was obtained.

After the experiment, an additional 3.4 grams of glyoxal was found in the sump. Accordingly, the reaction amounted to 75% of theory for a yield of 94% of theory.

It will be appreciated that the instant specification and examples are set forth by way of illustration and not limitation and that various modifications and changes may be made without departing from the spirit and scope of the present invention.

What is claimed is:

1. A glyoxal hemiacetal of the formula

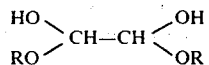

wherein each R is an alkyl radical of 4 to about 36 carbon atoms.

2. A glyoxal hemiacetal according to claim 1 wherein the alkyl radical has at least about 8 carbon atoms.

3. The process which comprises reacting a mixture consisting of an alkanol having 4 to about 36 carbon atoms in liquid state and an aqueous solution of glyoxal of about 2 to 80% concentration by weight, the molar ratio of glyoxal to the alkanol being at least 1:2, whereby there is formed the hemiacetal of glyoxal which is separated out.

4. The process of claim 3 wherein the alkanol has at least about 8 carbon atoms.

5. The process of claim 3 wherein said aqueous glyoxal solution is the conventional crude oxidation product of acetaldehyde or ethylene with nitric acid.

* * * * *